United States Patent

[11] 3,556,192

| [72] | Inventors | Elmer J. Strang;<br>Billy L. Sorenson, Fort Dodge, Iowa |
|---|---|---|
| [21] | Appl. No. | 783,615 |
| [22] | Filed | Dec. 13, 1968 |
| [45] | Patented | Jan. 19, 1971 |
| [73] | Assignee | The Coats Company, Inc.<br>a corporation of Iowa |

[54] TIRE CHANGING STAND
13 Claims, 6 Drawing Figs.

[52] U.S. Cl. .................................................. 157/1.28
[51] Int. Cl. .................................................. B06c 25/06
[50] Field of Search .......................................... 157/1.17,
1.2, 1.22, 1.24, 1.26, 1.28

[56] References Cited
UNITED STATES PATENTS
2,439,135  4/1948  Johnson et al. .............. 157/1.28

| 2,840,143 | 6/1958 | Skiles | 157/1.26 |
| 3,064,718 | 11/1962 | Brosene, Jr. | 157/1.28 |
| 3,255,800 | 6/1966 | Strang | 157/1.24 |

Primary Examiner—Granville Y. Custer, Jr.
Attorney—Hofgren, Wegner, Allen, Stellman & McCord ABSTRACT: A tire changing stand of the type having a base with a rotatable rim holding table on one end of the base and an upright column on the other end of the base having a movable bead breaker shoe for loosening beads from a wheel rim resting partially on the table, characterized by the provision of a second movable bead breaker shoe positioned opposite the first movable bead breaker for loosening opposite beads of a tire sidewall away from a rim bead seat and by means associated with the upper bead breaker shoe for holding the rim against forces exerted by the lower bead breaker shoe.

FIG. 2
FIG. 3
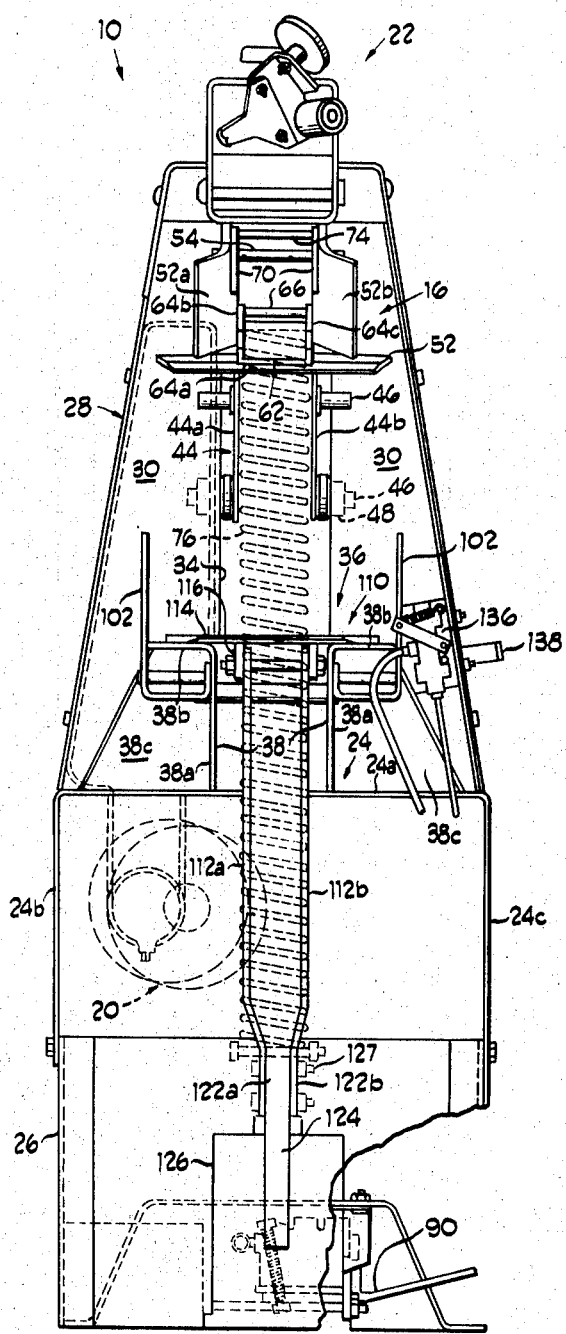
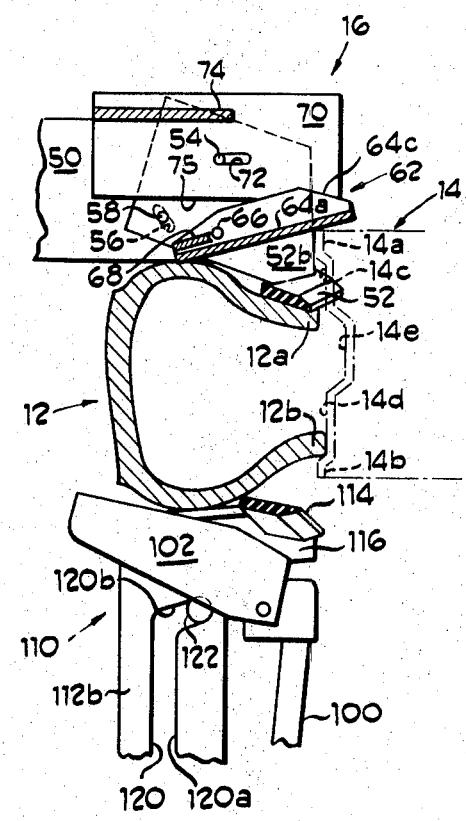

TIRE CHANGING STAND

BACKGROUND OF THE INVENTION

1. Field of the Invention

This invention relates to tire changing stands, and more particularly, to an improved tire changing stand of the type having a rotatable rim holding table.

2. Description of the Prior Art

The recent proliferation of different rim sizes, styles and shapes has made it desirable to provide a tire changing stand of the type which does not utilize a center mounting post for securing the rim to the stand. A major development in this type of tire changing stand is disclosed and claimed in the copending application of Strang et al., Ser. No. 661,686, entitled "Tire Changing Stand with Rotatable Rim Gripping Table," filed Aug. 18, 1967, U.S. Pat. No. 3,493,030, issued Feb. 3, 1970, and assigned to the assignee of this invention. This present invention is an improvement upon the structure shown in the aforesaid copending application.

Generally speaking, the structure disclosed in the aforementioned copending application operates most effectively for performing the tire removal and tire changing function. This structure is provided with one bead breaker shoe that moves vertically from a retracted position above the tire to an extended bead breaking position. To break both of the tire beads away from the rim bead seat it is necessary to retract the bead breaking shoe, turn over the wheel and rim, and repeat the operation. Because the tire and rim are not clamped in position during the bead breaking operation, but merely rest upon a supporting surface, less operator time is required to go through the tire removal and replacement operation in that the operator does not need to clamp and unclamp the rim at the bead breaking station. On the other hand, there is no positive means which holds the rim in place responsive to an upward force and this, up to now, has prevented the provision of a lower bead breaker shoe working in an opposite direction so that both beads of the tire could be broken from the rim by means of an upper and lower bead breaker shoe in tire changing stands of this type. Understandably, to be able to break both beads by such oppositely acting shoes would eliminate the time involved in turning the rim over to actuate the upper bead breaker shoe through its downward stroke a second time. Whereas, such oppositely working bead breaker shoes have been common in tire changing stands of the type wherein the rim is clamped on the rim supporting table (as shown in U.S. Pat. Nos. to Strang 3,255,800 and Bishman 3,032,094), no such shoes have been provided on tire changing stands of the type shown and claimed in the copending application Ser. No. 661,686, and a need and a desire therefore has arisen in the art.

SUMMARY OF THE INVENTION

This invention is directed to an improved tire changing stand of the type having a bead breaking station where a rim merely rests on a supporting surface and is not positively clamped thereon, such type typically being provided with a rotatable rim gripping table for tire removal, wherein the stand is provided with oppositely working bead breaking shoes so that both of the tire beads may be broken from the rim bead seat in one continuous, uninterrupted operation.

The best mode currently contemplated for carrying out this invention includes the provision of a rim holding member on the upper shoe carriage which engages and holds the rim during downstroke of the upper bead breaker shoe and thereby opposes the action of the lower bead breaker shoe as it moves through the bead breaking function. In addition, the upper bead breaker shoe serves as a stop for the lower bead breaker shoe in that the upper bead breaker shoe is driven by a larger force multiplying mechanism than the lower bead breaker shoe so that as the two shoes approach each other the thrust of the lower shoe is overcome by the magnified force application of the upper shoe.

BRIEF DESCRIPTION OF THE DRAWINGS

FIG. 2 is an end elevational view of the tire changing stand shown in FIG. 1 with parts broken away for clarity of illustration;

FIG. 3 is an enlarged fragmentary sectional view of the tire changing stand shown in FIG. 1, illustrating the movement of the upper bead breaker shoe to a bead breaking position wherein the tire bead is broken away from the rim bead seat;

DESCRIPTION OF THE PREFERRED EMBODIMENTS

Figure 1:
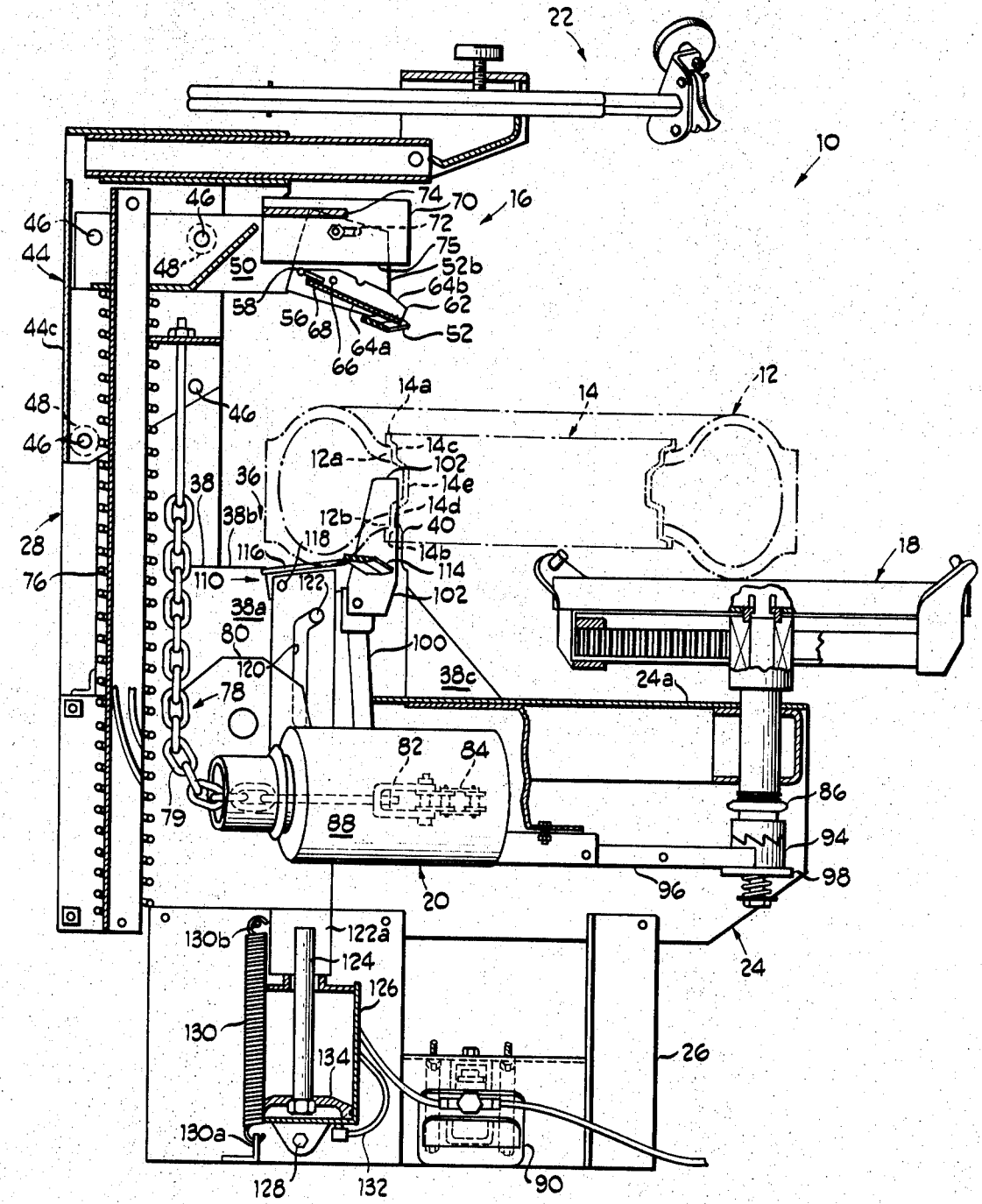
FIG. 1 is a side view, generally in vertical section, of a tire changing stand embodying this invention.

The tire changing stand 10 of this invention is an improvement upon the tire changing stands shown and claimed in the copending application of Strang et al., Ser. No. 661,686 entitled "Tire Changing Stand with Rotatable Gripping Table," filed Aug. 18, 1967, and assigned to the assignee of this invention. Generally speaking, the stand 10 is intended for use in removing or replacing tires 12 relative to rims 14. Typically, tire removal is accomplished by first moving tire beads 12a and 12b away from rim bead rim flanges 14a and 14b and across bead seats 14c and 14d, respectively, toward the rim drop center or well 14e. Following this, the tire beads are pried over the rim flanges to remove the tire.

The tire changing stand includes an upper bead breaking means 16 for separating tire beads from vehicle rims; a rotatable rim holding assembly 18 for holding and rotating a rim during removal and replacement of tires relative to rim; a power source 20 for driving both the upper bead breaker means 16 and the rotatable tire holding assembly 18; and a tool assembly 22 for use in removing and replacing tires relative to the rims as the tires are held and driven by the rotatable tire holding assembly 18.

The tire changing stand 10 includes a frame 24 supported on a base 26 with an upright column 28 at one end of the frame. Generally speaking, most of the components of stand 10 are made of suitably functional and durable materials for performing their intended operations. The frame generally includes a U-shaped member of heavy gauge sheet metal and having a top 24a and depending sides 24b and 24c. The column generally consists of two generally identical hollow trapezoidal boxes 30 which are spaced apart from each other to define a tracking channel 34.

In the area adjacent the base of column 28 and the top of frame 24, a tire supporting shelf or wheel supporting area 36 is provided for holding a portion of the tire and rim during the bead breaking operation. In the illustrated embodiment, the shelf 36 is comprised of a pair of generally identical, opposed inverted L-shaped members 38 including spaced apart upright portions 38a and outwardly facing lip portions 38b. Bracing members 38c extend downwardly and outwardly from the members 38 to the frame 24 for transferring load imposed upon the shelf 36 into the frame. An arcuate rim stop 40 spans the distance between the upright portions 38a of members 38 and protrudes slightly above the lip portions 38b. In use, the rim stop 40 is utilized in generally registering a vehicle rim and tire with respect to the bead breaker assemblies.

The upper bead breaker assembly 16 is similar to the bead breaker assembly disclosed in the aforementioned copending application Ser. No. 661,686, but includes the improvements disclosed in the application of Scott, Ser. No. 711,362, entitled "Guide for Bead Breaker Shoe Assembly," filed Mar. 7, 1968, Pat. No. 3,504,727, issued Apr. 7, 1970, and assigned to the assignee of this invention. Thus, the upper bead breaker assembly comprises a shoe carriage that includes a boxlike tracking member 44 having opposite sidewalls 44a and 44b closely adjacent the inner walls of the trapezoidal boxes 30, and further includes a rear wall 44c which spans the sidewalls 44a and 44b. Several pins 46 extend through sidewalls 44a and 44b to secure the two together. Rollers 48 are mounted at the opposite wall ends of diametrically opposite pins 46 with the rollers and pins in engagement with the front walls and rear walls of the trapezoidal boxes thereby mounting the tracking member 44 for vertical to and fro movement in column 28.

A pair of arms 50 extend outwardly from member 44. An arcuate upper bead breaker shoe 52 is supported on a pair of substantially identical generally L-shaped shoe plates 52a and 52b that are pivoted to arms 50 by means of a bolt 54 which extends through openings (not shown) in each of the arms. Below bolt 54, the arms 50 are provided with inclined slots 56 and a pin 58 which extends through slots 56 and is connected to plates 52. By this arrangement, the plates 52 are mounted for pivotal movement with respect to the arms 50.

A generally U-shaped tonguelike member 62 extends in a generally forwardly rearwardly direction and slightly downwardly between the arms 50. The tongue has a flat base 64a and upright sidewalls 64b and 64c. A pin 66 pivotally mounts the tongue 62 with respect to the arms 50. A crossbar 68 spans the sidewalls of the tongue. When the tongue is pivoted downwardly so that it rests upon the shoe 52, the bar 68 and the rear walls of the tongue abut the bolt 58 and hold the same with the upper and rearwardmost portions of slots 56, thereby holding the plates in a retracted position. As the arms 50 are moved downwardly to bring the shoes in engagement with the tire sidewall, the tongue will finally strike the rim flange of the vehicle rim, which, in turn, will cause the tongue to be pivoted upwardly about the pin 66, moving crossbar 68 in the rear end of the sidewalls of the tongue below the bolt 58. At this point, the shoe assembly is free to pivot about the upper bolt 54 so that the continued downward movement of the arms 50 permits radially inward movement of the shoe towards the center of the rim.

The upper bead breaker assembly 16 further includes a wheel holding member shown as a pair of clamping plates 70 which are positioned between the shoe plates 52a and 52b and generally overlie the rim or wheel supporting area. The function of plates 70 is to hold rim 14 against opposing forces and also limit the stroke of shoe 52. Clamping plates 70 are slotted at 72 through which the upper bolt 54 passes, thereby mounting the upper plates for to and fro movement with respect to the arms 50. When the plates are retracted or moved inwardly toward column 28, they will clear rim 14 on the downstroke of shoe 52 and therefore be inoperative for their intended function. The upper plates are joined by a crossbar 74 to hold the plates in a generally horizontal plane.

The underside 75 of clamping plates 70 comprise rim engaging surfaces which abut the rim flange and clamp the rim and tire against the wheel supporting area after movement of the upper bead breaker shoe assembly through its bead breaking stroke. Generally, all rims, regardless of size have a fixed dimension from the rim flange 14a to the rim well 14e on the side of the short bead seat 14c. Further, tires are usually mounted so that the outside sidewall of the tire is adjacent the short bead seat 14c and the inside sidewall is adjacent the long bead seat 14d. In normal tire changing practice, involving single shoe changers, the tire bead is broken away from the shorter bead seat first. Since the upper shoe 52 will generally be working on the outside tire sidewall and along the short bead seat, the existence of this generally fixed dimension may be utilized for providing generally uniform applicability of the clamping plates to all wheel rims. The underside 75 is spaced from shoe 52 a distance generally corresponding to the distance from rim flange 14a across short bead seat 14c to rim well 14e. Thus, surface 75 will abut rim flange 14a at the time that shoe 52 has travelled to well 14e and completed the upper bead breaking stroke, limiting further movement of shoe 52 and holding the rim and tire at the wheel support area.

The upper bead breaker assembly 16 and the rotatable rim gripping table 18 are driven by means substantially identical to that disclosed in the copending Strang application, Ser. No. 661,686. The upper bead breaker assembly is normally held in a retracted or upper position by means of compression spring 76 and pulled to a lower or bead breaking position by a flexible tension drive member 78.

Included in drive member 78 is chain 79 which is connected to the upper bead breaker assembly. Chain 79 is wound about a rotatable hexagonal sheave 80 and coupled, as shown at 82, to a transversely oriented chain element 84 which forms part of the flexible tension drive member 78. Chain 84 is wound about a sprocket 86 to a connection with the linearly extensible and retractable piston rod (not shown) of a force multiplying means such as piston and cylinder device 88, so that as fluid is fed from a source of fluid under pressure (not shown) into the cylinder 88 and exhausted therefrom, responsive to actuation of foot valve 90, the piston rod will extend and retract, moving the chains 78 and 84 thereby effectuating movement of the upper bead breaker shoe assembly.

The drive for the rotatable rim gripping table 22 includes a disengageable clutch 94. A pair of arms 96 rest upon a flange 98 of the clutch 94 to disengage clutch 94 by downward movement of the arms 96. The arms are linked to arms 100 which, in turn, are pivoted to crank arms 102 on opposite sides of members 38. As crank arms 102 are pivoted downwardly responsive to a wheel and rim being placed upon members 38, arms 96 will be moved downwardly to disengage the clutch 94 and thereby discontinue the application of any driving force to the rotatable rim gripping table.

In addition to the clamping bars 70 for the upper bead breaker shoe assembly 16, this invention is further directed to the provision of a lower bead breaker shoe assembly 110. Lower shoe assembly 110 includes a pair of generally parallel barlike spaced arms 112a and 112b uprightly positioned between the members 38. The arms 112a and 112b support an arcuate lower bead breaker shoe 114 connected to a shoe support 116 which is pivoted at 118 between the arms. Each pair of arms is provided with a generally vertically elongate slot 120 including a vertical portion 120a and an upwardly inclined portion 120b at the top thereof. A pin 122 extends through slots 120 and is fastened between the members 38 so that movement of shoe 114 will be guided by the engagement of the pin 122 in slots 120 of each of the arms 112. Thus, when the arms are first moved in a generally upright direction the shoe will also be guided inwardly towards the drop center on the rim 14 until the pin 122 is at the juncture of the straight portion 120a and inclined portion 120b of slot 120. Then, the pin will track in the straight portion 120a and further movement of shoe 114 will be generally in a straight, upright path towards upper shoe 52.

Pin 122 is located a fixed distance from the rim locator 40 relative to lower shoe 114 to properly orient shoe 114 for tracking relative to rims held at the wheel supporting area. It has been found that, because the bead breaker shoe works on a small arcuate segment of the tire and rim the track of the shoe is true for rims between radial dimensions of 10 to 18 inches.

The lower ends of each of arms 112a and 112b are inwardly offset as at 122a and 122b, respectively, and connected to a piston rod 124 which extends outwardly from piston and cylinder device 126. In the illustrative embodiment, the connection is accomplished by means of a nut and bolt arrangement 127 but it is to be understood that any other suitable arrangement may be utilized. Piston and cylinder device 126 is pivoted at 128 to the frame of the tire changing machine to permit slight rocking thereof responsive to the tracking of pin 122 in slots 120 of the arms 112a and 112b.

Return means, such as a return spring 130, is secured to the frame at 130a and to the arms 112 at 130b to provide a means for returning the lower bead breaker shoe 114 to the retracted position after the extension of piston rod 124. Fluid supply lines 132, in communication with a source of fluid under pressure (not shown) lead into force multiplying means or cylinder 126, on one side of piston 134. The lines also lead to a control valve 136 on the upright column which is actuated by control knob 138.

Responsive to actuation of the valve 136, when fluid 132 is admitted into the cylinder 126, it pushes against the piston 134 causing the rod 124 to extend outwardly in the well-known fashion. This forces the arms 112a and 112b initially upwardly and inwardly, and then subsequently uprightly as the pin 122 tracks in the slots 120 and the corresponding movement is imparted to the lower bead breaker shoe. To return the lower shoe 114 and the arms 112a and 112b to the retracted position, the fluid control valve 136 is actuated to release fluid from the cylinder 126 and the return springs 130 then cause the desired retrograde movement. It is to be understood that while the piston cylinder device 126, shown and described herein as a single acting device, a double acting piston and cylinder device can be utilized, thereby eliminating the need for return springs 130.

Means are provided for limiting the movement of the lower bead breaker shoe. Preferably, the piston and cylinder device 88 which powers movement of upper shoe 52 is of a larger magnitude or output than cylinder 126 which powers movement of lower shoe 114. Thus, when shoe 114 is moved to a position where it abuts shoe 52 (with the tire beads sandwiched therebetween), the overpowering opposing force acting through shoe 52 will limit further movement of shoe 114.

Figure 4:
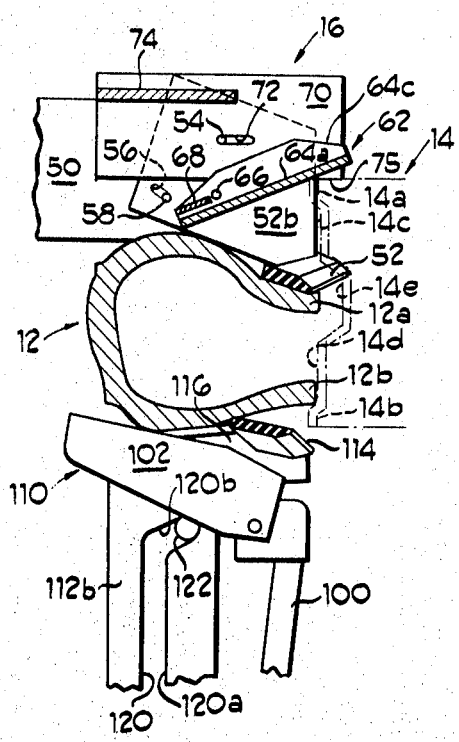
FIG. 4 is a view similar to FIG. 3 showing the upper bead breaker shoe at the completion of its bead breaking stroke.

In operation, the operator places a rim 14 having a tire 12 to be removed therefrom on the stand 10 with the interior of the rim abutting the locator 40 and a portion of the tire on the wheel supporting area 36. This causes the crank arms 102 to pivot downwardly and, through the described mechanism, to disengage the clutch 94 so that table 18 will be inoperative. The operator then depresses the foot valve 90 which causes actuation of the cylinder 88, and through the drive chains 84 and 79, pulls the upper bead breaker assembly 16 downwardly. The upper bead breaker shoe 52 engages the upper tire sidewall and subsequent downward movement of the assembly 16 causes the tongue 62 to be pivoted as it engages the rim flange 14a so that the shoe 52 is free to pivot inwardly relative to the center of the rim during its continued downward movement. The downward movement of the upper bead breaker assembly will be terminated when the underside 75 of clamping plate 70 engages the rim flange 14a of rim 14. This also will hold the rim and tire securely on the wheel supporting area against opposing forces. At this point, the upper tire bead 12a will be moved to the position shown in FIG. 4 and the upper shoe has completed its bead breaking stroke.

Figure 5:
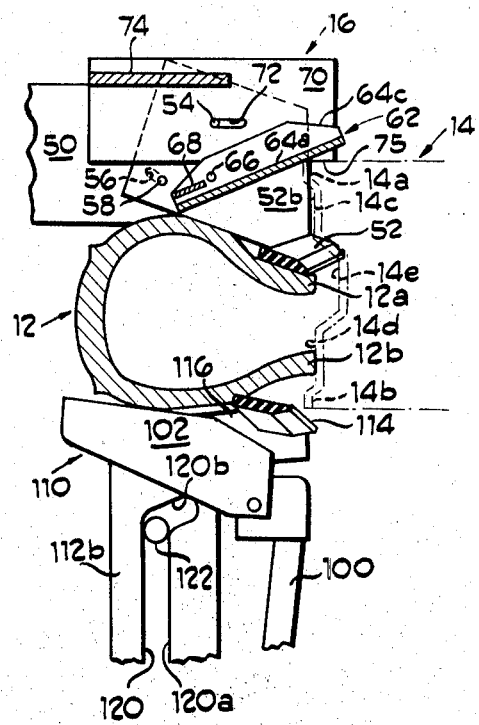
FIG. 5 is a view similar to FIGS. 3 and 4 showing the initial movement of the lower bead breaker shoe through its bead breading stroke.
Figure 6:
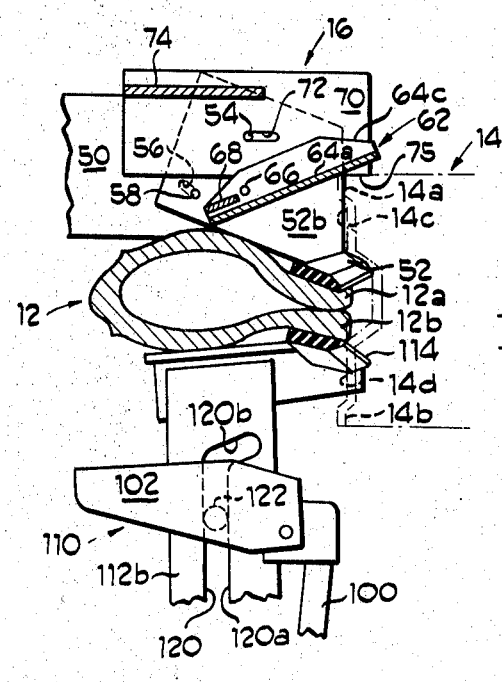
FIG. 6 is a FIG. similar to FIGS. 3 through 5 showing the upper bead breaker shoe at the completion of its bead breaking stroke.

The operator then actuates the valve 136 by movement of knob 138 to actuate the cylinder 126 and move rod 124 upwardly. This initiates actuation of the lower bead breaking assembly 110 with the arms 112a and 112b first moving inwardly and upwardly toward the rim as pin 122 tracks in portion 120b of slots 120, and then directly upwardly as the pin 122 continues to track in portions 120a of slots 120. The clamping plates 70 hold the rim on support area 36 against the forces imposed by lower bead breaker assembly 110. Movement of the lower bead breaker shoe 114 attached to the arms 112a and 112b continues as shown in FIGS. 5 and 6 to separate tire bead 12b away from bead seat 14d until the shoe 114 squeezes the bead 12b against the bead 12a, which is backed by shoe 52. Since the upper bead breaker assembly 16 is powered by a larger force multiplying means than the lower bead breaker assembly of which shoe 114 is a part, the opposition of shoes 114 and 52 will terminate movement of the lower bead breaker assembly 110. The operator may then move knob 138 to deactivate cylinder 126 and return spring 130 will retract the lower bead breaker assembly and shoe 114. Next, the release of foot valve 90 will result in retraction of upper bead breaker assembly 16 and shoe 52 through the influence of return spring 76. Following this, the operator may remove the tire 12 from the rim 14 in a known manner utilizing the tool assembly 22 as described in the aforementioned copending Strang et al. application, Ser. No. 661,686.

This invention provides an improvement in a tire changing stand of the type wherein the rim is not initially clamped at the bead breaking station, such as the type having a rotatable wheel gripping table and an upper bead breaker assembly mounted for movement in a column at one end of the stand. The improvement of this invention provides a second, lower bead breaker assembly and means associated with the upper bead breaker assembly for holding a rim against the opposing forces of a lower bead breaker assembly and for also limiting the stroke of the lower bead breaker assembly. Thus, the tire removal operation may be accomplished in a shorter period of time with less manipulative steps to be performed by the operator.

The foregoing detailed description has been given for clearness of understanding only, and no unnecessary limitations should be understood therefrom, as some modifications may be obvious to those skilled in the art.

We claim:

1. In a tire changing stand for use in mounting and demounting tires relative to vehicle rims, the stand being of the type having a frame; a wheel supporting area on the frame for supporting the wheel generally on the sidewall portion of a tire; motor means in the frame; a first shoe carriage operably connected to said motor and mounted in said frame for engagement with a tire sidewall during movement through a bead breaking stroke toward said wheel supporting area, and a retracted position away from said wheel supporting area responsive to actuation of said motor means; a first bead breaker shoe connected to said carriage for breaking first tire beads away from a first rim flange of a wheel positioned on said wheel supporting area during movement of said first carriage theretoward; the improvement which comprises a wheel holding member operably connected to said first carriage and positioned behind said first shoe relative to the wheel supporting area on the frame to engage a vehicle rim and hold the rim to the wheel supporting area following engagement of the first bead breaker shoe with a tire sidewall during movement of said carriage through said bead breaking stroke.

2. The tire changing stand of claim 1 wherein a second shoe carriage is mounted on the frame in the wheel supporting area for movement towards the first shoe carriage, said second shoe carriage having a second bead breaker shoe thereon, and means in said frame operatively connected to said second carriage to move the same through a bead breaking path.

3. The tire changing stand in claim 1 wherein the wheel holding member is movable from a retracted position wherein it avoids engagement with a vehicle rim to an extended position wherein it is positioned to engage a vehicle rim.

4. The tire changing stand of claim 2 wherein the wheel holding member includes a rim engaging surface which is spaced from said shoe a distance generally equal to the distance between a rim flange and rim drop center.

5. The tire changing stand of claim 2 wherein the second shoe carriage is positioned generally opposite said first shoe carriage for movement in mutual opposition to each other with the means for moving the second carriage being of lesser magnitude than the motor means for moving the first shoe carriage.

6. The tire changing stand of claim 5 wherein the second shoe carriage is connected to the frame by a pin and slot arrangement for guiding the second bead breaker shoe through the bead breaking stroke.

7. The tire changing stand of claim 6 wherein the wheel supporting area includes rim locator means for orienting a rim relative to the bead breaker shoes and wherein the pin of the pin and slot arrangement is positioned at a fixed distance from the rim locator means.

8. The tire changing stand of claim 7 wherein the wheel holding member includes a rim engaging surface which is spaced from said shoe a distance generally equal to the distance between a rim flange and rim drop center.

9. In a tire changing stand for use in mounting and demounting tires relative to vehicle rims of the type having a frame, a wheel supporting area on the frame; motor means in the frame; and upper shoe carriage operably connected to said motor and mounted in said frame for movement through a bead breaking stroke toward said wheel supporting area and to a retracted position away from said wheel supporting area responsive to actuation of said motor means; an upper bead breaker shoe connected to said carriage for breaking upper tire beads away from upper rim flanges of wheels positioned on said wheel supporting area during movement of said carriage through said bead breaking stroke; the improvement which comprises a lower bead breaker shoe mounted in said frame generally in opposition to said upper shoe for movement through a bead breaking stroke toward said upper shoe and a retracted position away therefrom; means operatively connected to said lower shoe for moving the same through said bead breaking stroke; and means on said upper shoe carriage and spaced from said motor means for limiting the bead breaking stroke of said upper shoe within a range which permits movement of said lower shoe through a functional bead breaking stroke.

10. The tire changing stand of claim 9 wherein the upper shoe stroke limiting means is connected to the upper shoe carriage and positioned, relative to the wheel supporting area, to engage a wheel rim positioned thereat during movement of the upper shoe carriage toward the wheel supporting area to hold the rim in opposition to forces applied by the lower shoe.

11. The tire changing stand of claim 9 wherein the wheel supporting area includes rim locator means for orienting a rim relative to the bead breaker shoes and wherein the lower bead breaker shoe has a cam surface which tracks on a pin positioned a fixed distance from the rim locator.

12. The tire changing stand of claim 9 wherein the upper shoe stroke limiting means is movable between a retracted inoperative position and an extended position wherein it will overlie and engage a rim at the wheel supporting area during movement of the upper shoe carriage through the bead breaking stroke.

13. The tire changing stand of claim 9 wherein the upper and lower shoes are each connected to force multiplying means with the upper shoe being connected to a force multiplying means of a greater magnitude than the lower shoe force multiplying means.